C. W. H. FREDERICK.
CAR SEAT.
APPLICATION FILED APR. 24, 1908.
971,983.
Patented Oct. 4, 1910.
6 SHEETS—SHEET 1.
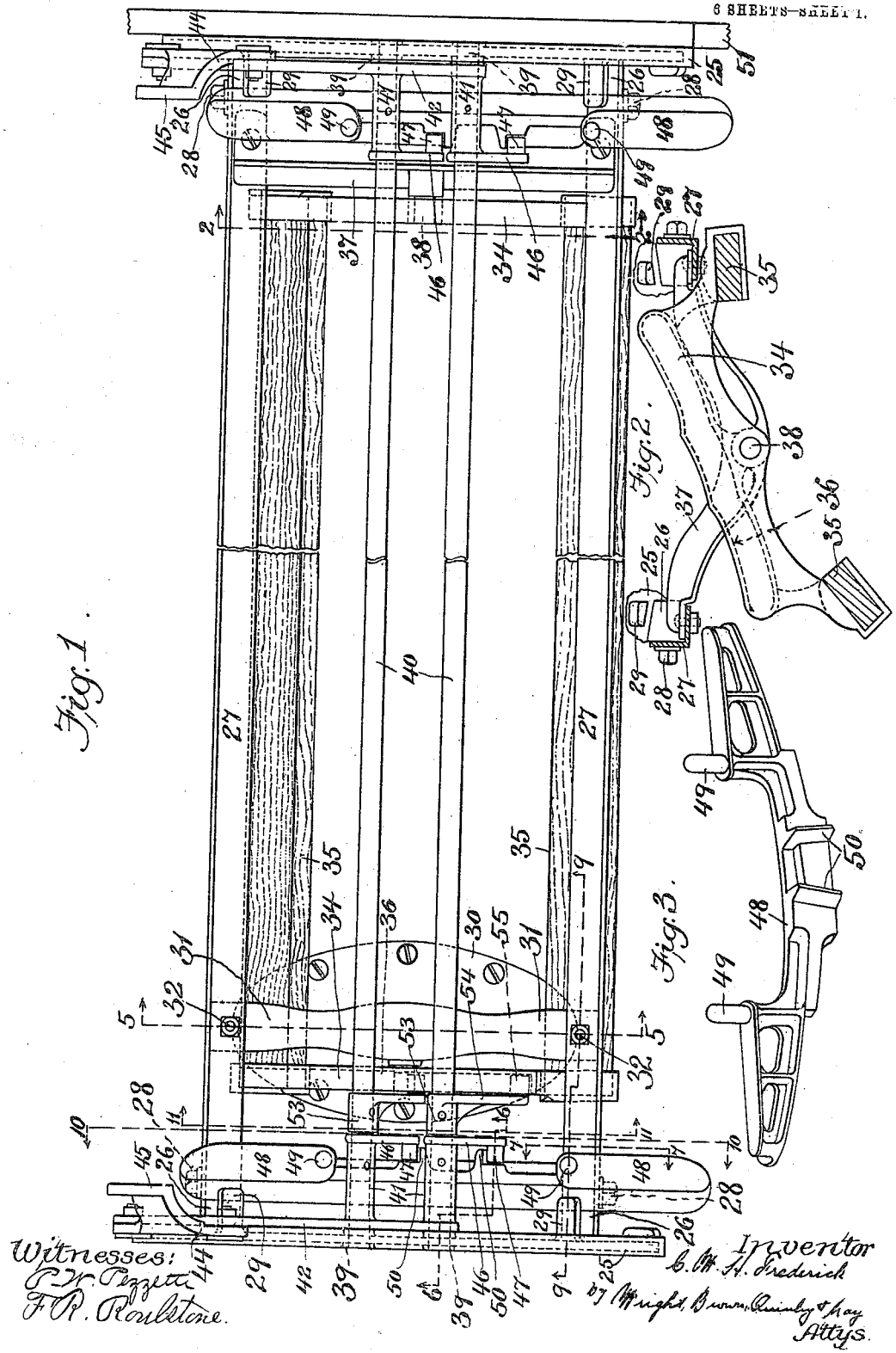

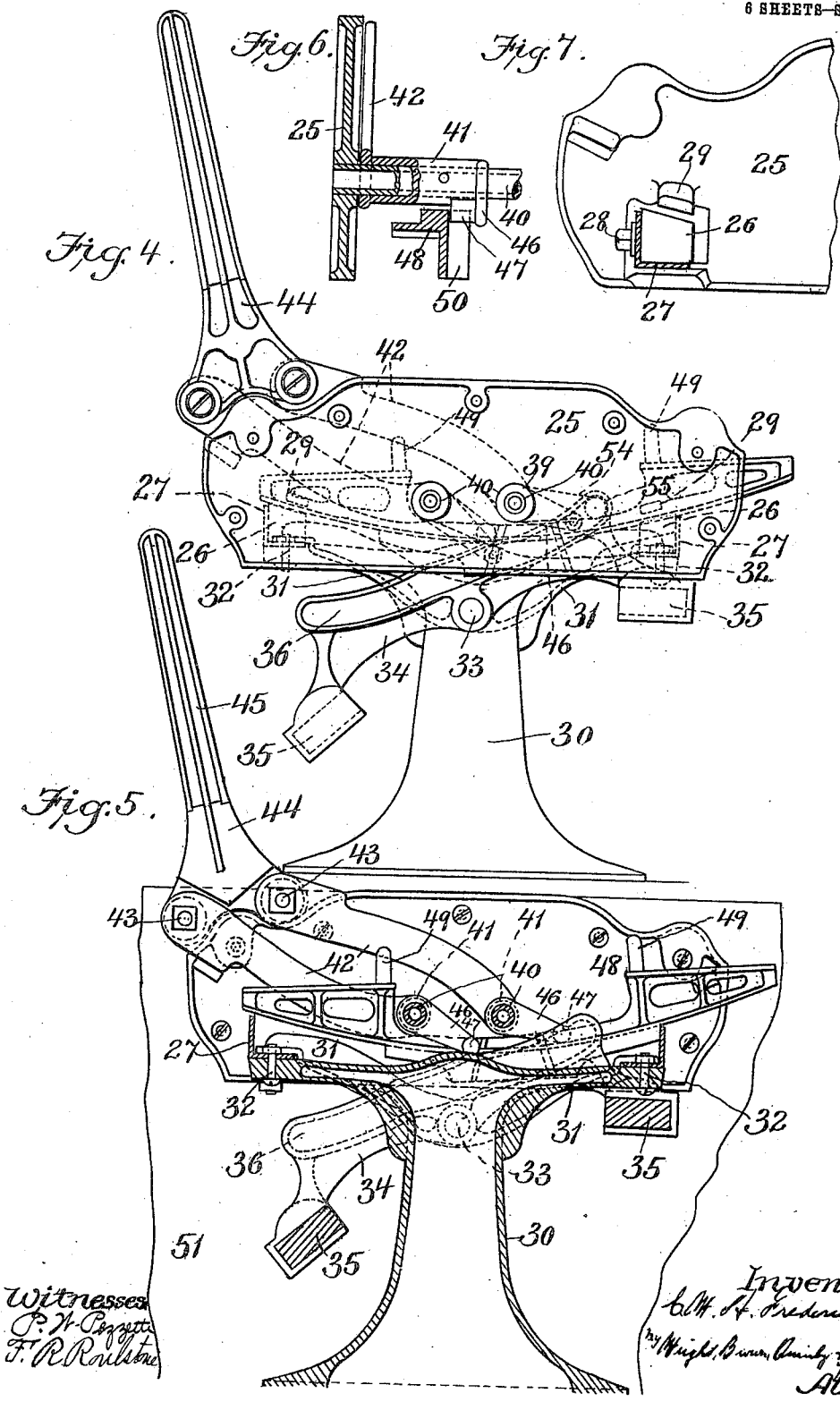

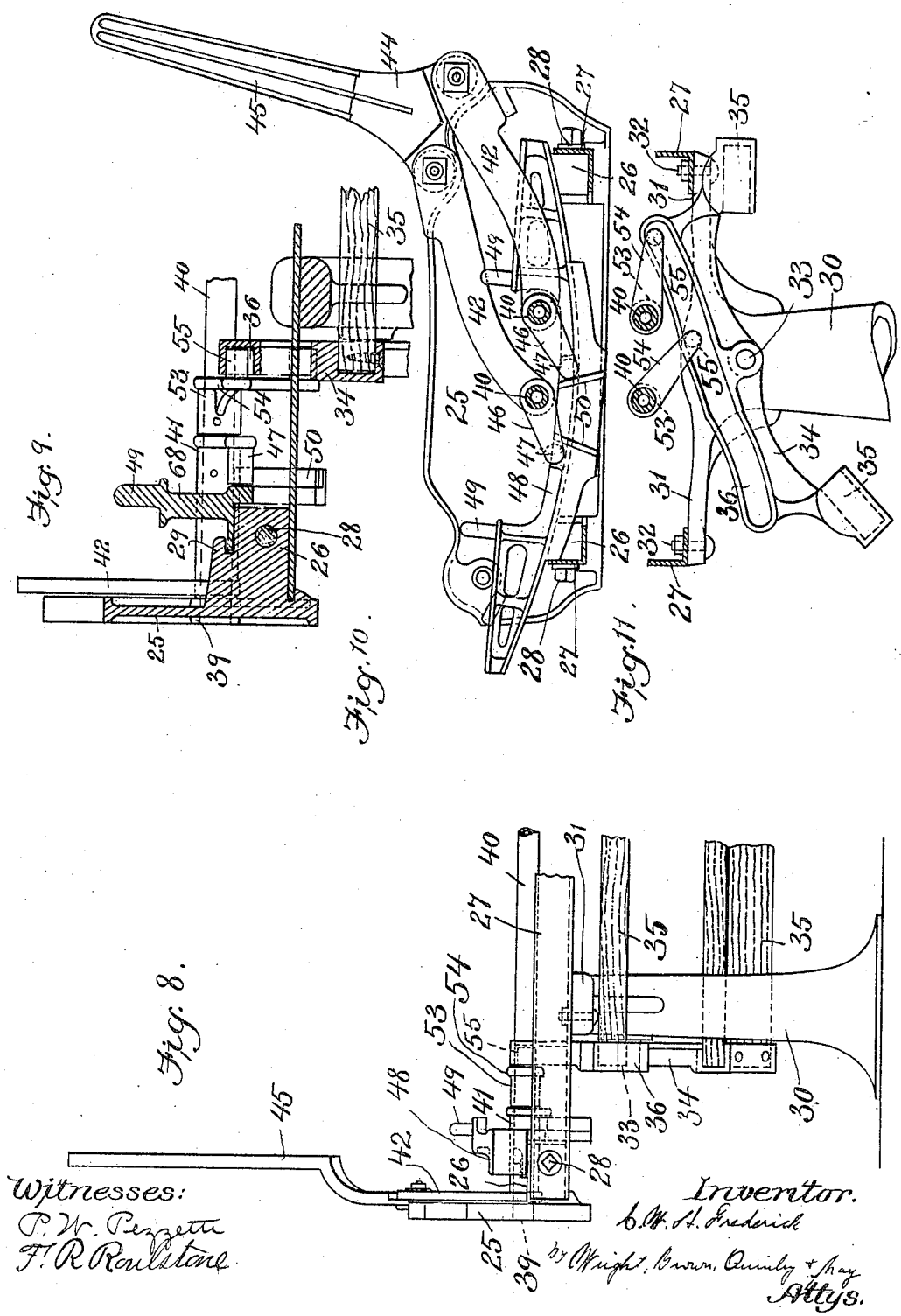

C. W. H. FREDERICK.
CAR SEAT.
APPLICATION FILED APR. 24, 1908.
971,983.
Patented Oct. 4, 1910.
6 SHEETS—SHEET 4.
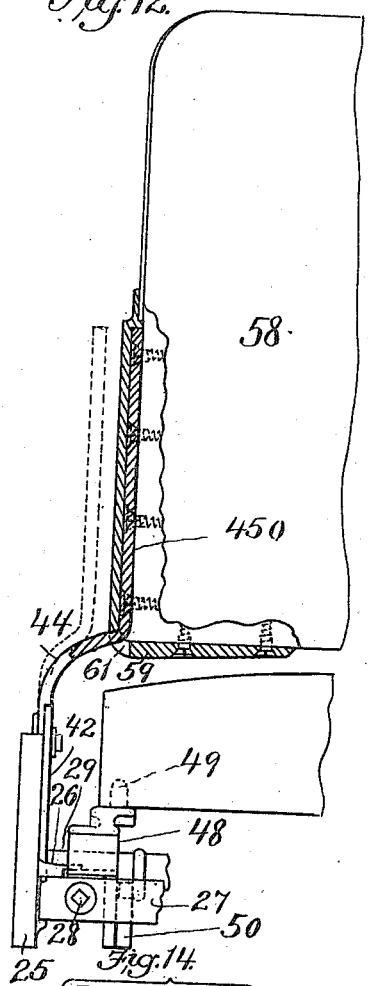
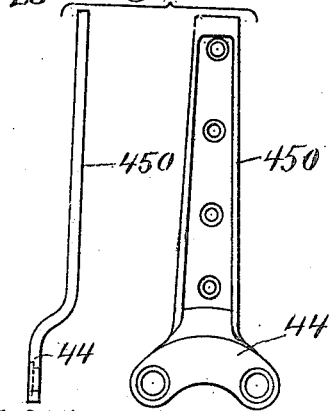
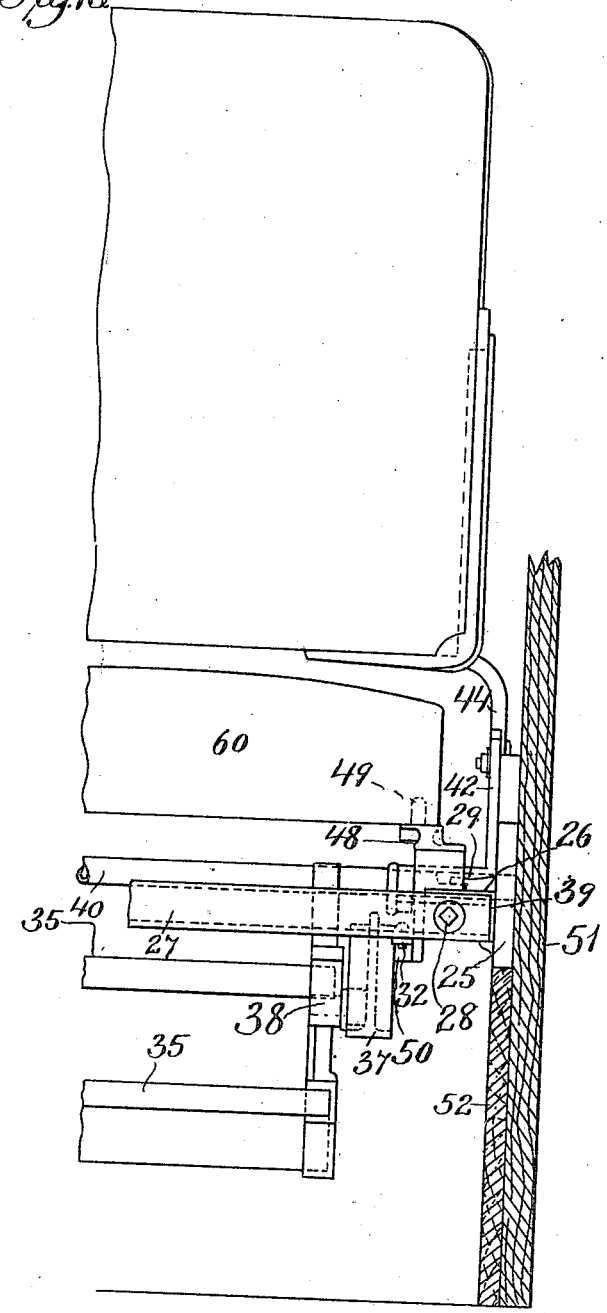

C. W. H. FREDERICK.
CAR SEAT.
APPLICATION FILED APR. 24, 1908.
971,983.
Patented Oct. 4, 1910.
6 SHEETS—SHEET 5.
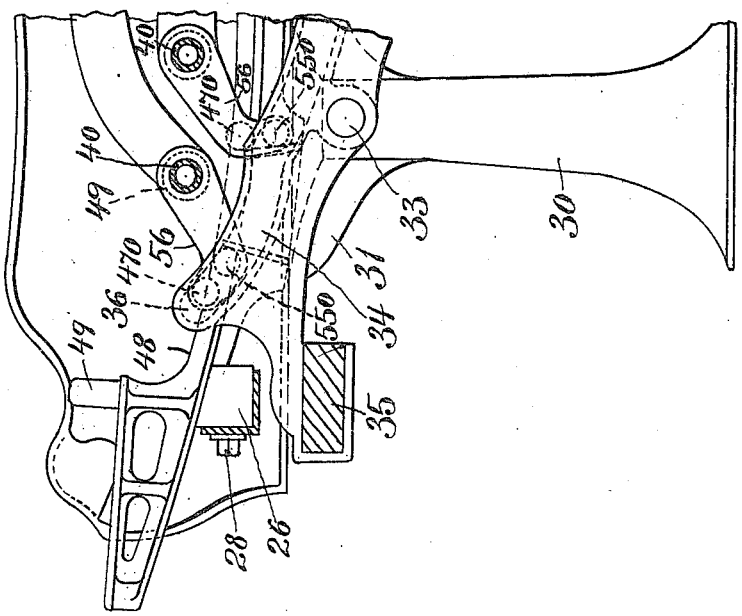
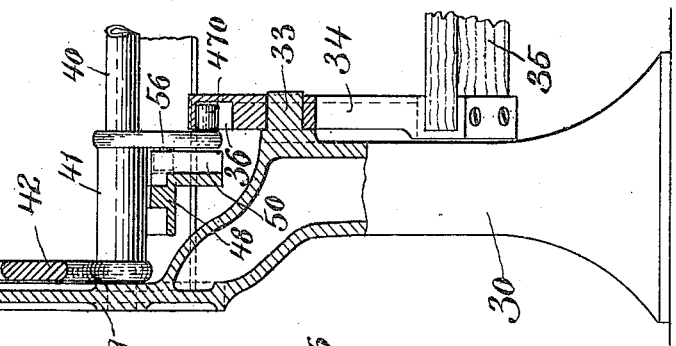
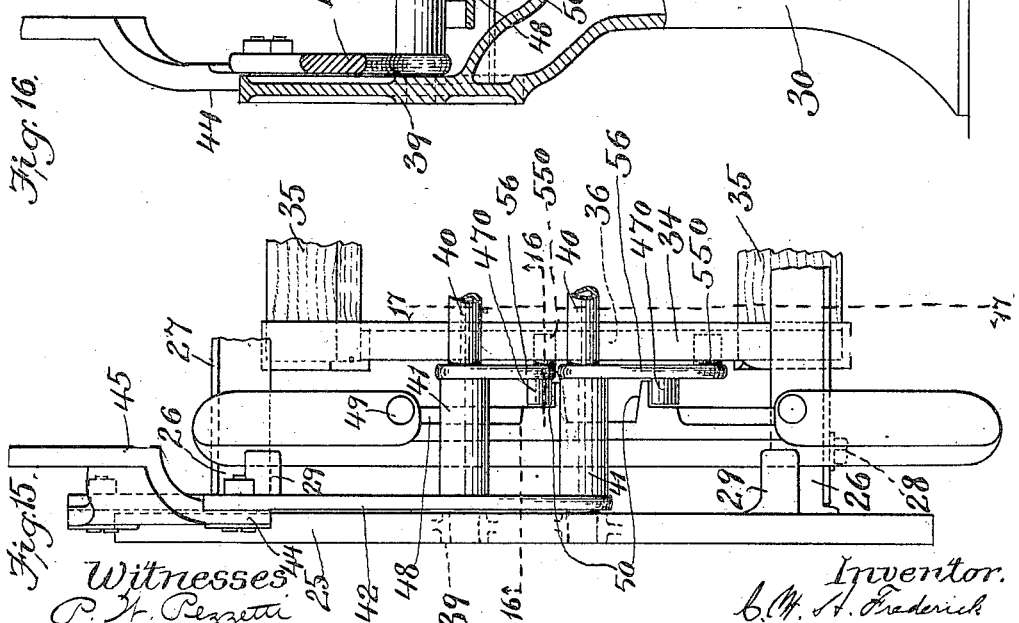

C. W. H. FREDERICK.
CAR SEAT.
APPLICATION FILED APR. 24, 1908.
971,983.
Patented Oct. 4, 1910.
6 SHEETS—SHEET 6.
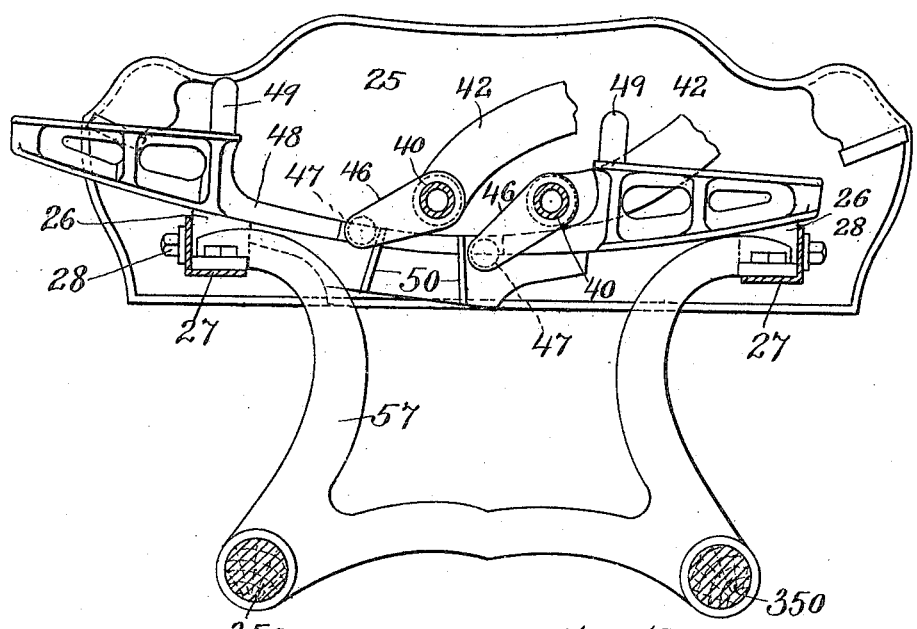
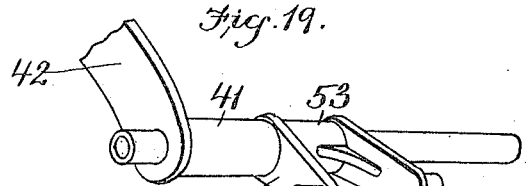
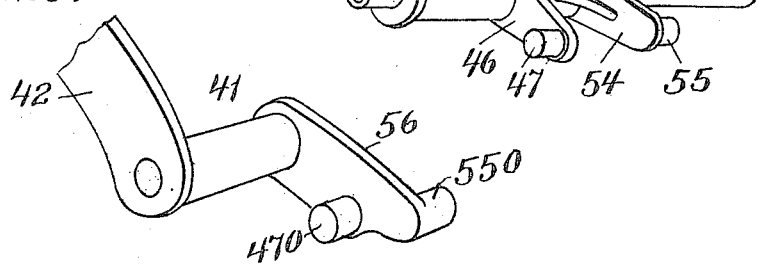
Witnesses:
P. W. Pezzetti
F. R. Roulstone
Inventor:
C. W. H. Frederick
by Wright, Brown, Quinby & May
Attys.

UNITED STATES PATENT OFFICE.

CHARLES W. H. FREDERICK, OF MELROSE, MASSACHUSETTS.

CAR-SEAT.

971,983.  Specification of Letters Patent.  Patented Oct. 4, 1910.

Application filed April 24, 1908. Serial No. 428,952.

*To all whom it may concern:*

Be it known that I, CHARLES W. H. FREDERICK, of Melrose, in the county of Middlesex and State of Massachusetts, have invented certain new and useful Improvements in Car-Seats, of which the following is a specification.

This invention relates to that type of car seats having a reversible back which is capable of being shifted from one edge of the seat cushion to the other edge without turning it over, mechanism being employed intermediate the cushion and the seat back whereby the reversal of the latter will shift the cushion in order to preserve the proper relationship of the seat and cushion.

My invention especially relates to car seats of what are known as the "Wheeler" type which employs two parallel rods or "pipes" which form part of the intermediate shifting mechanism between the seat and back.

One of the objects of my invention is to provide a structure of car seat of this type having the rocker extending entirely under the connecting rock shafts or pipes, and having mechanism whereby a longer throw can be given to the rocker than has heretofore been accomplished.

Another object of the invention is to provide a structure whereby the truss plank employed at the side of the car will be cleared by the mechanism even if the said plank is quite wide, or if it is made as a boxing to inclose heater pipes, this being accomplished without making the seat itself any higher than is customary.

Another object of the invention is to provide an improved structure whereby less space than usual will be necessary for the mechanism at both the wall end and the aisle end.

Other objects are to provide improved and simplified details of construction as will be more fully explained hereinafter, the said improvements being designed to simplify the essential features of the seat and to secure greater durability of the operating parts of the mechanism, and to facilitate the assemblage of the parts both in the original construction of the seat and when repairing the same.

As will become apparent hereinafter, I am enabled to expose a greater width of the seat cushion when the back is in its proper position without increasing the actual width of said cushion, thus making the seat more comfortable than is usual with the type of seat in which the seat cushion is shifted from one position to another by cams or levers which move the rockers that support the seat cushion.

With the above described objects in view, my invention consists in the construction and combination of parts substantially as hereinafter described and claimed.

Of the accompanying drawings, Figure 1 is a plan view of a complete car seat embodying my improvements, the seat cushion and the back itself being omitted. Fig. 2 represents a section on line 2—2 of Fig. 1 but omitting the rocker and other mechanism at that end of the seat. Fig. 3 is a perspective view of one of the rockers. Fig. 4 is an end view from the left of Fig. 1. Fig. 5 is a view similar to Fig. 4, but with the parts in section on the line 5—5 of Fig. 1. Fig. 6 represents a detail section on the line 6—6 of Fig. 1. Fig. 7 represents a detail section on the line 7—7 of Fig. 1, but omitting the rocker. Fig. 8 represents a partial front elevation of the left hand portion of the seat structure shown in Fig. 1. Fig. 9 represents a section on line 9—9 of Fig. 1. Figs. 10 and 11 represent respectively sections on lines 10—10 and 11—11 of Fig. 1. Figs. 12 and 13 are detail front elevations of the end portions of the seat, said figures including the cushion and a removable back. Fig. 14 represents an edge view and an elevation of a back-supporting arm which may be employed. Fig. 15 is a detail plan view similar to the left hand portion of Fig. 1 but on a larger scale and illustrating a modified structure of the arms which actuate and shift the rocker and foot rails. Fig. 16 represents a front elevation of the structure shown in Fig. 15. Fig. 17 represents a section on line 17—17 of Fig. 15. Fig. 18 is a view similar to Fig. 10, but on a larger scale, and illustrating a modified structure of foot rail support. Fig. 19 is a detail perspective illustrating the arms which actuate the rocker and oscillating foot rail. Fig. 20 is a perspective view of an arm provided with two studs for actuating the rocker and oscillating foot rail, said figure corresponding with the structure shown in Figs. 15, 16 and 17.

Similar reference characters indicate the same or similar parts in all of the views.

The seat comprises two end plates 25 which are practically duplicates of each other, each plate being formed with two lugs 26 to which the sills 27, preferably of angle iron, are secured by bolts 28. Each end plate is also formed with a lip 29 which projects parallel or substantially parallel with the upper surface of the lug 26. The two rockers, hereinafter described, are adapted to slide on the upper faces of the lugs, said rockers having flanges which extend under the guide lips 29.

One end plate is usually attached to the side wall of the car, but the frame, comprising the two end plates and the angle iron sills, may be supported by two pedestal bases or by two "cricket" legs, if desired. The preferable form, however, is as indicated in the drawings, wherein one end plate is secured to the wall of the car and a pedestal base leg 30 supports the aisle end of the frame by means of arms 31 projecting from the top of the said pedestal base, said arms being attached to the angle iron sills by bolts 32.

The pedestal base 30 is formed with a stud bearing 33 on which a bar 34 is mounted to oscillate, said bar supporting the aisle end of the two foot rails 35, and the bar being also formed with a groove 36, the object of which will be explained presently. Secured to the sills, near the wall end thereof, is a brace 37 which is formed with a stud bearing 38 for another oscillating end bar 34. The two oscillating end bars are formed with opposing recesses or sockets which receive the ends of the foot rails.

The end plates 25 are formed with bearing 39 (see Fig. 4) for the rock shafts 40. These rock shafts are usually tubular and are commonly referred to in car seats of this type as the "pipes." For convenience, however, they will be referred to hereinafter as rock shafts. Referring particularly to Figs. 1, 4, 5 and 6, it will be seen that on each end of each rock shaft 40 there is secured as by pinning, a hub or sleeve 41, which hub is provided at one end with a lever arm 42, and at the other end with a short arm 46. At each end of the seat, the two lever arms 42 are pivotally connected at 43 to a head 44 formed at the lower end of the back-supporting arm 45. Each arm 46 is formed with a stud 47. These arms are sometimes referred to as crank arms. They serve to actuate the rockers 48 so as to slide them forward or backward on the lugs 26. Each rocker is formed with upwardly projecting pins 49 which engage suitable sockets in the frame of the seat, which seat is only shown at 60 in Figs. 12 and 13. One face of each rocker is provided with ears 50 against the outer faces of which, the studs 47 of the crank arms bear. Said ears preferably diverge downwardly as indicated. The bearing faces of the lugs 50, 50, are presented toward both the front and rear of the seat, the studs 47 of the crank arms engaging said bearing faces so as to perform the seat shifting operation when swinging downward and under the axes of oscillation. The arrangement is such that the crank arms, while of ample length to impart the required shift to the seat rocker, are still so short as to readily clear the upper surface of a truss board when the requirements of the car structure are such that said truss board is of considerable width as hereinafter described.

When the seat back, which is carried by the arms 45, is thrown from one extreme to the other, the crank arms shift the rockers and the seat carried thereby forward or backward as shown by comparing Figs. 5 and 10. Owing to the fact that the rockers extend under the "pipes" or rock shafts instead of above them, the crank arms are able to have an operative throw of almost one-half a circle. With crank arms of a given length, it is obvious that a greater reciprocating movement can be given to the rockers, when the studs of the crank arms engage the outer sides of the ears 50, than would be the case if they engaged the inner sides of said ears, because, in the latter case, the arms would necessarily interfere with each other. A car seat of a similar or Wheeler type as shown in my Patent No. 751,277, granted February 2, 1904, but in that patent the rockers extend over the rock shafts instead of under them and therefore the reciprocatory movement of the rocker is limited by contact of the lugs with said rock shafts. In that construction, the reciprocatory movement of the rocker is necessarily limited to accord with the actual length of the cams which engage the lugs of the rocker. But with my present construction, the reciprocatory movement imparted by the shifting of the back is almost double the actual length of each crank arm 46. By this construction I am enabled to obtain a greater movement of the seat backward and forward and yet employ shorter crank arms than in the former construction. The result of this is that the crank arms and rockers can be mounted directly above the truss plank of the car when the latter is of the usual height and is made quite wide and without having the elevation of the seat any greater than customary.

In Fig. 13, the wall of the car is indicated at 51 and the truss plank at 52. As will be readily seen in said figure, the truss plank can be made much wider and as a boxing to contain heater pipes and still be of the same height and not interfere with the operation of the rocker and its actuating arms.

I will now describe the means for oscillating the end bars 34 and the foot rails 35 carried thereby.

Mounted on the rock shafts 40, at one or both ends thereof, are the hubs 53 of the arms 54, said hubs being preferably pinned to the shafts. The arms 54 are formed with studs 55 which enter the groove 36 of the bar 34. Sometimes these arms 54 are employed only at one end (the aisle end) of the seat, because one pair of such arms will be sufficient to oscillate the foot rails. But a more rigid structure is provided by having a pair of arms 54 secured to the rock shafts 40 at each end thereof and having their studs 55 enter the grooves of both oscillating bars 34. Preferably the hubs 53 are separate from the hubs 41 of the lever arms 42, as shown in Figs. 1 and 9. This enables the foot rails to be made long or short as may be desired. For instance, the oscillating bar 34 near the aisle end of the seat may be mounted inside of the pedestal leg 30 instead of outside, the pedestal leg being mounted in a position so that its stud bearing 33 projects inward instead of outward. Then the hubs 53 will be secured to the shafts 40 at points farther removed from the aisle end of the seat frame. This of course necessitates making the foot rails shorter, but this is sometimes desired.

In Figs. 15, 16, 17 and 20, I have indicated each hub 41 as formed with an arm 56 which is provided with two studs 470 and 550, said studs projecting from opposite faces of the arms 56 and designed to serve the same purpose as the studs 47 and 55 respectively hereinbefore described. This provides a lighter and somewhat simpler structure since one arm with two studs is made to serve the same purpose as the two arms 46 and 54 of the form first described. But the structure illustrated in Fig. 20 does not of course permit of any adjustment of the relative positions of the rockers and the oscillating end bars 34.

I do not limit myself to the employment of the oscillating end bars and foot rails supported thereby, as instead I may employ hangers 57 as indicated in Fig. 18, which hangers depend from the angle iron sills 27 and support foot rails 350.

The back 58 (see Figs. 12 and 13) may be removably connected with the supporting arms 45 as by providing said back with socket pieces 59 at the corners, which socket pieces can be slipped onto or removed from the upper ends of the arms 45. If a back is desired of greater width, the arms 45 may have the shape indicated by dotted lines in Fig. 12. This however, would permit less aisle room although affording a wider back for the occupant of the seat. The socket pieces 59 have openings as indicated at 61, which permit the arms 45 to be easily inserted or removed from said socket pieces. If it is not desired that the back shall be removable, the supporting arms may be formed with screw holes as indicated in Fig. 14. In said figure, the back-supporting arms as a whole, are indicated at 450. When arms of this type are employed, screws may pass through the holes directly into the end frame bars of the back 58.

The especial advantages of the structure of the rockers and the arrangement thereof relative to the rock shafts, have been pointed out. Other advantages of my present structure of the car seat, as a whole, are as follows:—The seat may be taken out entirely without removing the wall end casting or the pedestal base by simply removing the bolts which secure the angle iron sills to the said end casting and pedestal base. Or the aisle end casting or end plate may be taken away after removing the bolts 28. Also the position for the pedestal base may be varied without altering any part of the seat frame structure, because it can be bolted to any portion lengthwise of the angle iron sills.

I claim:—

1. A car seat comprising seat-supporting rockers, provided with bearing faces presented toward both the front and the rear of the seat, a pair of rock shafts extended across the upper edges of said rockers, back supporting arms secured to said rock shafts, and crank arms carried by said rock shafts and independent of said back supporting arms, said crank arms being provided with lateral projections engaging said bearing faces.

2. A car seat comprising end plates provided with lugs, angle iron sills secured to said lugs, seat supporting rockers resting on said lugs and provided adjacent each end with stop shoulders arranged to engage said sills, said rockers being also provided with centrally located bearing faces presented toward both the front and the rear of the seat, a pair of rock shafts extended across the upper edges of said rockers, crank arms on said shafts engaging said bearing faces, and means for operating said rock shafts.

3. A car seat comprising end plates provided with lugs, angle iron sills secured to said lugs, seat supporting rockers resting on said lugs and provided adjacent each end with stop shoulders arranged to engage said sills, said rockers being also provided with centrally located bearing faces presented toward both the front and the rear of the seat, a pair of rock shafts extended across the upper edges of said rockers, crank arms mounted on said rock shafts and having lateral extensions engaging said rock shafts, and back supporting arms also secured to said rock shafts.

4. A car seat comprising seat supporting rockers having bearing faces presented toward both the front and the rear of the seat, a pair of rock shafts extended across the upper edges of said rockers, oscillating bars provided with means for supporting foot rails, crank arms provided with means for operating said rockers and said oscillating bars, and back supporting arms independent of said crank arms and secured to said rock shafts.

5. A car seat comprising in its construction seat supporting rockers having bearing faces presented toward both the front and rear of the seat, a pair of rock shafts extended across the upper edges of said rockers and having crank arms provided with lateral projections engaging said bearing faces, back-supporting arms secured to said rock shafts, oscillating bars provided with means for supporting foot-rails, and arms secured to said rock shafts and having lateral projections for actuating the rockers and arms of said oscillating bars.

6. A car seat comprising in its construction end plates, angle iron sills connected to said end plates, a brace connecting the angle irons at one end and having an oscillating bar mounted thereon, a base support on the other ends of the angle irons and having an oscillating bar mounted thereon, foot-rails carried by said oscillating bars, seat-supporting rockers having bearing faces presented toward both the front and rear of the seat, a pair of rock shafts extended across the upper edges of said rockers and having crank arms provided with lateral projections engaging said bearing faces, back-supporting arms secured to said rock shafts, and arms secured to the rock shafts and having lateral projections for actuating the oscillating bars.

7. A car seat comprising end plates provided with lugs, angle iron sills secured to said lugs, seat supporting rockers resting on said lugs and constructed to be limited in their movement by said sills, a brace secured to said sills near one end plate, a pedestal, oscillating bars supported by said brace and pedestal, and means for simultaneously operating said rockers and said oscillating bars.

8. A car seat comprising end plates, angle iron sills connected therewith, a brace connecting the angle irons at one end and having an oscillating bar mounted thereon, a base support on the other end of the angle irons and having an oscillating bar mounted thereon, foot rails carried by said oscillating bars, seat supporting rockers having bearing faces presented toward both the front and rear of the seat, and means engaging said bearing faces to shift said rockers, the movement of said rockers being limited by said sills.

9. In a car-seat, the combination with end plates, of a back, rock shafts mounted in said end plates, connections between said back and rock shafts whereby movements of the back will oscillate the rock shafts, arms projecting from said rock shafts and having lateral projections at their ends, rockers extending under the rock shafts and having spaced apart ears, the outer faces of said ears being engaged by the lateral projections on the rock shaft arms, and a seat detachably mounted on said rockers.

In testimony whereof I have affixed my signature, in presence of two witnesses.

CHARLES W. H. FREDERICK.

Witnesses:
P. W. PEZZETTI,
C. F. BROWN.